United States Patent [19]
Svensson

[11] Patent Number: 5,305,686
[45] Date of Patent: Apr. 26, 1994

[54] FRY BASKET

[75] Inventor: S. Alfred Svensson, Cincinnati, Ohio

[73] Assignee: Falcon Fabricators, Inc., Batavia, Ohio

[21] Appl. No.: 59,440

[22] Filed: May 7, 1993

[51] Int. Cl.⁵ ............................................. A47J 37/12
[52] U.S. Cl. ...................................... 99/407; 99/410; 99/417; 99/426; 99/450; 211/126; 211/181; 220/485; 220/489; 220/494
[58] Field of Search .................... 99/403, 410–418, 99/448, 426, 450; 211/126, 181; 220/485, 487, 489, 494; 126/369

[56] References Cited

U.S. PATENT DOCUMENTS

| | | | |
|---|---|---|---|
| 803,200 | 10/1905 | Stripe | 220/485 |
| 2,524,900 | 10/1950 | Einhorn | 220/494 |
| 2,588,614 | 3/1952 | Capra et al. | 99/450 |
| 2,600,439 | 6/1952 | Sloane | 220/485 |
| 3,964,628 | 6/1976 | Wilson | 99/448 |
| 4,006,675 | 2/1977 | Lill | 211/126 |
| 4,106,486 | 8/1978 | Lee | 126/369 |
| 4,321,859 | 3/1982 | Rimmeir | 99/416 |
| 4,508,027 | 4/1985 | McCord | 99/418 |
| 4,542,684 | 9/1985 | Cantrell | 99/403 |
| 4,854,227 | 8/1989 | Koopman | 211/181 |

FOREIGN PATENT DOCUMENTS 2309418 11/1976 France ................................. 220/485

Primary Examiner—Timothy F. Simone
Attorney, Agent, or Firm—Wood, Herron & Evans

[57] ABSTRACT

An improved basket for the preparation of fried food products includes a wire mesh bottom wall and three upstanding wire mesh side walls. A perforate gate is pivotally attached along the fourth side of the basket and is secured in a closed configuration by a latching arm pivotally attached to a top edge of each side wall. Handles including a grip are also attached to the top edge of the side walls and can be used for the insertion and removal of the basket containing food products from a hot oil bath. The fried food products can be gently removed from the basket and deposited onto a worktable by conveniently tilting the basket to an inclined orientation so that the latching arm disengages from the gate either by gravity or by downward pressure on a lever arm attached thereto. Once the latching arm disengages from the gate, the gate is free to swing to an open position and the food products are gently deposited from the basket to a worktable through the /pening created at the bottom of the gate without damaging the food or coatings thereon.

11 Claims, 2 Drawing Sheets

FRY BASKET

BACKGROUND OF THE INVENTION

This invention relates to a metal basket, and more particularly, to a metal basket for use in the frying of food products.

A common method of food preparation is to immerse the food products into a bath of hot oil for a specified length of time. Once the food is done, it is removed from the hot oil bath and the excess oil is drained from the food prior to the serving or continued preparation thereof. For example, many so-called fast food outlets serve fried chicken, french fries, or other food products prepared by immersion and frying in hot oil. After the chicken or the like has been prepared, such as by being dipped or encased in batter, it is placed in a wire mesh basket. The basket is then immersed in the hot oil for the required amount of time until the chicken is done. The basket is then removed from the hot oil and the excess oil is drained prior to removal of the chicken or other food products from the basket.

Currently, the fried chicken and other food products are removed from the basket after cooking by inverting the basket and dumping the contents or by individually scooping the items from the basket onto a worktable or other receptacle for further preparation or serving to the customer.

However, a problem with the fry baskets currently in use is that when the fry basket is removed from the hot oil bath and inverted to dump the fried chicken or other food products onto the worktable, the food products are damaged in the dumping process. Specifically, the batter or other coating applied to the chicken, which is often a significant flavor feature, is damaged or knocked from the chicken in the dumping process.

One method of removal from the basket to avoid such harsh treatment of and damage to the food is to individually scoop or remove the items as with a spoon or tongs. This method avoids the damage to the food products associated with dumping the contents from the fry basket; however, individually handling the items is very time consuming and labor intensive and is not consistent with the service goals of many fast food establishments.

Therefore, a need exists in the food service and preparation industries for a fry basket which is capable of containing food items while being immersed in the hot oil bath and permits the removal of the undamaged food in a safe and efficient manner.

SUMMARY OF THE INVENTION

An objective of the present invention has been to provide an improved fry basket from which food products contained therein can be removed safely and efficiently without damaging the food.

This objective of the invention is attained by a generally rectangular wire mesh basket having three interconnected upstanding side walls joined to a wire mesh bottom wall. The fourth side of the basket is a perforate gate pivotally attached to the two adjacent side walls in order to swing between a closed position and an open position. In the closed position the gate is perpendicular to the two adjacent side walls and the bottom wall. In the open position the bottom edge of the gate is pivoted away from the bottom wall to create an opening therebetween through which the product may be dumped from the basket with minimal or no damage to the product.

A latching arm on the top edge of each of the two side walls adjacent to the gate latches the gate in the closed position. A lever arm is joined to each latching arm, and the joined latching and lever arms are pivotally connected to the top edge of each of the two side walls adjacent to the gate. The lever arm enables the user or operator of the fry basket to secure the gate in the closed position with the latching arm or to disengage the latching arm from the gate thereby permitting the gate to swing to the open position.

The gate is removably and pivotally connected to each of the two adjacent side walls by a generally J-shaped bracket secured to the top edge of the side walls. A stubshaft projects laterally from the top edge of the gate and is retained between the top edge of the side wall and the bracket thereby releasably and pivotally mounting the gate to the basket.

The chicken, or the food products having batter or coating as appropriate, are placed for frying within the fry basket of the present invention. The gate is at this time secured in the closed position by the latching arm. The latching arm is generally L-shaped having a short vertical leg engaging or blocking the outside surface of the gate against opening movement and thereby latching the gate in the closed position to prevent it from swinging outwardly toward the open position. The fry basket and food products are then lowered into the hot oil bath by handles secured to the basket and extending upwardly from the top edge of the side walls of the basket. An uppermost portion of the handles is not immersed in the hot oil bath and is coated with a food grade plastic insulating the user from the heat transferred from the hot oil bath to the metal wire basket.

After the food products have been immersed in the bath an appropriate length of time, the user removes the basket from the bath by grasping a grip provided on each handle. After the basket containing the fried food products has been removed from the hot oil bath and excess oil has been drained therefrom, the food products are gently removed from the basket by tilting the basket forward toward the gate. By gravity, the food items advance toward the gate. The latching arm is then disengaged or removed from a blocking position relative to the gate, either by gravitational forces or the user applying downward pressure to the lever arm, thereby upwardly pivoting the latching arm.

After the latching arm is disengaged from or lifted to a non-blocking position relative to the gate, the gate swings to the open position by rotation of the stubshafts extending from the top edge of the gate within the brackets. With the gate open and the basket tilted, the food products are gently deposited onto a worktable without complete inversion of the basket and the resulting violent dumping of the basket.

BRIEF DISCUSSION OF THE DRAWINGS

These objectives of the present invention will become more readily apparent in the following detailed description taken in conjunction with the accompanying drawings in which.

DETAILED DESCRIPTION OF THE INVENTION

Figure 1:
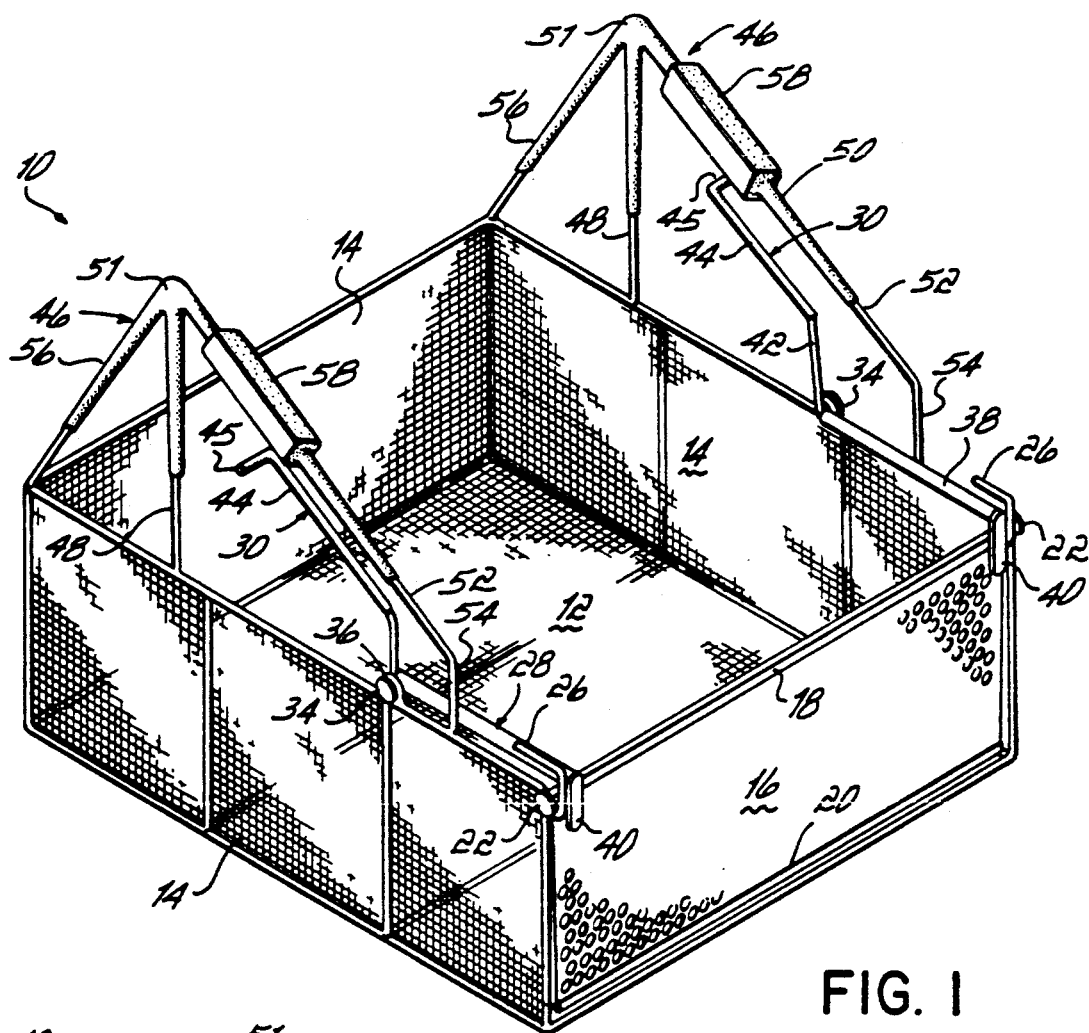
FIG. 1 is a perspective view of a fry basket according to the present invention.

Referring to FIG. 1, there is illustrated the fry basket 10 of the invention. The basket 10 has a bottom wall 12 and three upstanding side walls 14 generally perpendicular to the bottom wall 12. In the preferred embodiment, the basket 10 is rectangular with the bottom wall 12 and side walls 14 constructed of ⅛ inch stainless steel mesh joined to a stainless steel frame formed from ¼ inch rods.

A removable gate 16 is pivotally attached on a fourth side of the rectangular fry basket 10. The gate 16 is preferably made of 16-gauge stainless steel sheet perforated with ¼ inch diameter holes at 5/16 inch centers. A pair of stainless steel rods 18, 20 are welded to the top and bottom edges, respectively, of the gate 16. The rod 18, extending the length of the top edge of the gate 16, projects beyond each lateral side edge of the gate 16 and terminates on each lateral end with a circular end cap 22. The portion of the rod 18 extending beyond the side edges of the gate is a stubshaft 24 and is supported by a J-shaped bracket 26 fixedly secured as by welding to the top edge of each side wall 14.

Figure 4:
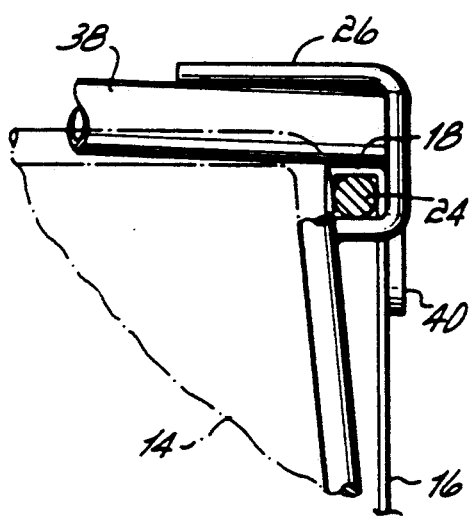
FIG. 4 is a partial cross-sectional view showing the pivotal attachment of the latching arm and lever arm to the side wall of the basket.

An L-shaped latching arm 28 is joined to a lever arm 30 on each side wall 14 of the basket 10 adjacent to the gate 16. The lever arm 30 and latching arm 28 are pivotally mounted to the top edge of the side wall 14 by a stubshaft 32 projecting from the lever arm 30 and terminating in a circular end cap 34. A U-shaped collar 36 is welded at each terminal end thereof to the top edge of the side wall 14. As seen in FIG. 4, the stubshaft 32 projecting from the lever arm 30 extends through the collar 36 and is retained therein by the end cap 34, thereby pivotally mounting the latching arm 28 and the lever arm 30 to the side wall 14.

Figure 2:
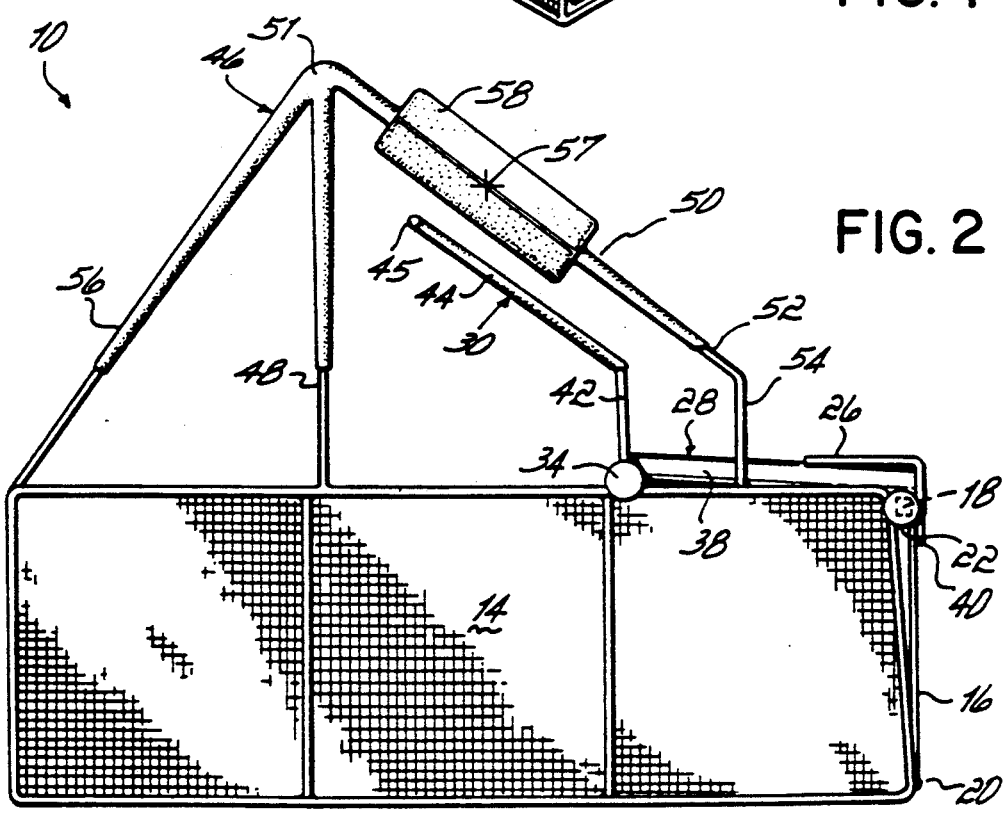
FIG. 2 is a side view of the fry basket of FIG. 1.
Figures 5, 6:
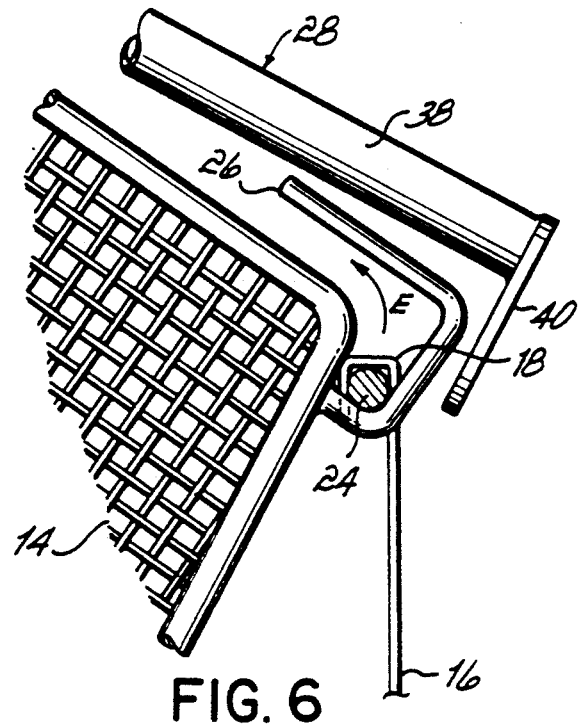
FIG. 5 is a partial side view of the latching arm securing the gate in the closed position.
FIG. 6 is a view similar to FIG. 5 with the gate in the open position and the basket at an inclined orientation permitting the latching arm to disengage from the gate.

The latching arm 28 is L-shaped having a long generally horizontal leg 38 and a short vertical leg 40 orthogonal to the long leg 38. The short leg 40 extends beyond a side edge of the side wall 14 and the gate 16 pivotally connected thereto to block and thereby retain the gate 16 in the closed position as shown in FIGS. 1 and 2. The short leg 40 may frictionally engage an outside face of the gate 16 in the closed position as shown in FIG. 5. The long leg 38 of the latching arm 28 is preferably constructed of a ⅛ inch stainless steel rod welded at its rearward end to the lower end of the lever arm 30.

The lever arm 30 includes a generally vertical portion 42 extending upwardly from the stubshaft 32 and an upwardly and rearwardly extending angular portion 44. The angular portion 44 terminates at the upper end in an outwardly turned end portion 45. The lever arm 30 is preferably constructed of a ¼ inch stainless steel rod.

A handle 46 is welded to the top edge of each side wall 14. Each handle 46 includes three bars 48, 50, 56, each fixedly joined as by welding at one end to the top edge of the side wall 14 and each joined at a second end to each other. The first bar 48 of the handle 46 generally extends perpendicular to the top edge of the side wall 14. The second bar 50 /f the handle 46 has an angular portion 52 extending downwardly and forwardly from the intersection with the top of the first bar 48. The second bar 50 is joined to the top edge of the side wall 14 by a vertical portion 54 which extends perpendicularly to the side wall 14 between the top of the side wall 14 and the lower front end of the angular portion 52 of the second bar 50. A third bar 56 of the handle 46 extends from a back corner of the basket 10 angularly upward and forwardly to join the top of the first and second bars 48, 50 at a point of intersection 51.

The second bar 50 of the handle 46 includes a grip 58 having a generally square cross-section mounted on the angular portion 52 thereof. The angular portion 44 of the lever arm 30 is generally parallel to the angular portion 52 of the second bar 50 when the gate 16 is in the closed position as shown in FIGS. 1 and 2. The center 57 of the grip 58 in the preferred embodiment of the present invention is positioned over the center of gravity of the basket 10.

The angular portion 44 of the lever arm 30 and the upper portions of the first 48, second 50 and third 56 bars, including the grip 58, of the handle 46 are covered in a food grade plastic coating. The plastic coating is preferably Plastisol which is applied in a thermoset vinyl hot dip process. The food grade plastic used for the coating must resist distortion and degradation at continuous high operating temperatures to be suitable for use in food preparation applications. The remainder of the basket 10 is preferably constructed of stainless steel.

In use, the basket 10 of the present invention with the gate 16 in the closed position as shown in FIGS. 1 and 2, is filled with food products (not shown), such as chicken or other items of food which are generally coated by a food batter. The basket 10 containing the food items is lowered into a hot oil bath (not shown). After the required amount of cooking time, the basket 10 and food items contained therein are lifted from the hot oil bath by a user or operator standing in front of the gate 16 and grasping the grips 58 provided on each handle 46.

Figure 3:
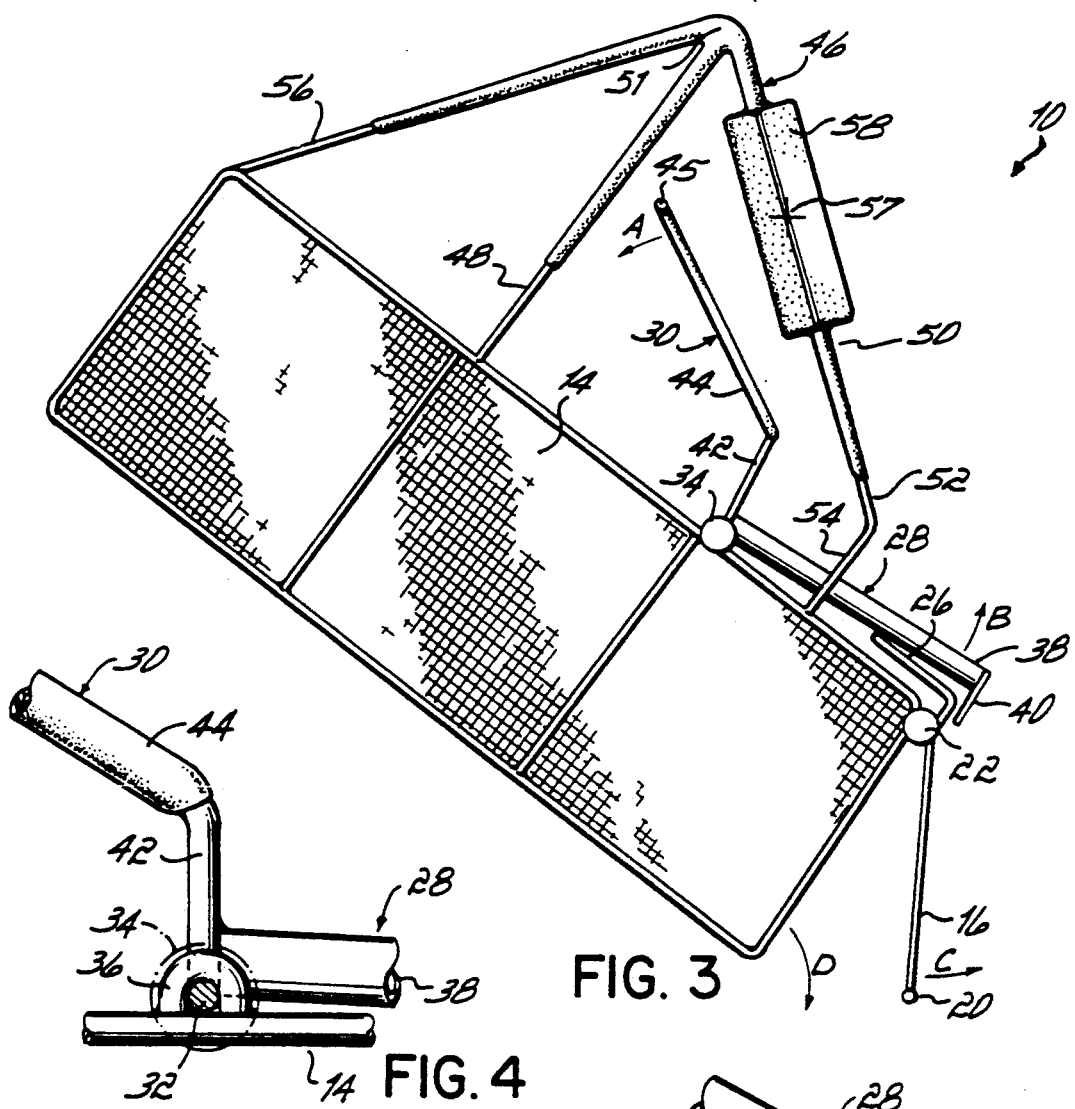
FIG. 3 is a view similar to FIG. 2 with the basket at an inclined orientation and the latching arm disengaged from the gate which has pivoted to an open position.

Once the basket 10 is removed from the oil bath and excess oil has been drained therefrom, the food products are removed from the basket 10 through the pivotal gate 16. The user or operator grasping the grips 58 and positioned in front of the gate 16 holds the basket 10 over a worktable (not shown) or other suitable surface and tilts the basket 10 toward himself such that the basket 10 is inclined with the gate 16 being lower than the opposing side wall 14, as shown in FIG. 3. With the basket 10 inclined and positioned over a worktable, the user pushes the lever arm 30 downwardly in the direction of arrow A with a finger while continuing to hold the grip 58. The downwardly pivoting of the lever arm 30 forces the latching arm 28 to pivot upwardly in the direction of arrow B, thereby disengaging the short leg 40 of the latching arm 28 from the gate 16 and permitting the gate 16 to swing to the open configuration in the direction of arrow C. The weight of the rod 20 along the bottom edge of the gate 16 in combination with the inclination of the basket 10 enables the gate 16 to pivot about the stubshafts 24 projecting from the top edge of the gate 16 and retained by the bracket 26.

Alternatively, after the operator has removed the basket 10 from the hot oil bath, allowed the excess oil to drain, and positioned the basket 10 over a worktable, the gate 16 may be pivoted to the open position without manually depressing the lever arm 30 but by allowing gravitational forces to pivot the latching arm 28 from engagement with the gate 16 by the increased inclination of the basket. The long leg 38 of the latching arm 28 is constructed preferably of ¼ inch stainless steel rod and is of sufficient weight and preferably balanced to pivot in the direction of arrow B (FIG. 3) when the basket is tilted to the appropriate inclination, typically about 45° to 75° relative to a horizontal plane. The operator is able to conveniently and comfortably rotate the basket 10 to the required inclination due to the angled configuration of the grips 58 on the third bar 56 of the handle 46 and the positioning of the grips 58 along the center of gravity of the basket 10.

After the basket 10 has been tilted to the inclined configuration of FIG. 3 and the gate 16 has swung to the open position shown in FIGS. 3 and 5, the food products fall out of the basket 10 as indicated by arrow D and onto a worktable (not shown). The food products are transferred from the basket 10 to the worktable without completely inverting the basket 10 nor damaging the food products or battered coatings thereon. As a result, the present invention provides a safe and efficient basket for the preparation of fried foods without damaging the food products upon their removal from the basket.

An additional feature of the preferred embodiment of the present invention is the ability to remove the gate 16 from the basket 10. As shown in FIG. 6, with the latching arm 28 pivoted upwardly and the short leg 40 disengaged from the gate 16 which has swung to the open position, the stubshafts 32 extending from each lateral end of the rod 18 on the top edge of the gate 16 can be removed from between the bracket 26 and the top edge of the side wall 14 upwardly and rearwardly in the direction of arrow E. The gate 16 is conveniently removed from the basket 10 in this manner for the cleaning and sanitizing of the gate 16 and basket 10 or for the storage or other required functions of the basket 10 or gate 16.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof:

I claim:

1. A basket for frying food products which comprises:
   a perforate bottom wall;
   a plurality of interconnected perforate side walls each having a top edge and a bottom edge, said bottom edge of each said side wall being fixedly joined to said bottom wall;
   a gate having a top edge, a bottom edge, and a pair of opposed side edges;
   means for pivotally connecting said side edges of said gate to two of said side walls, said connecting means being operable to enable said gate to be moved between a closed position in which said gate bottom edge is proximate said bottom wall and an open position in which said gate bottom edge is displaced from said adjacent bottom wall; and
   means for releasably latching said gate in said closed position.

2. The basket of claim 1 wherein said connecting means pivotally and removably couples said gate with said two side walls.

3. The basket of claim 1 wherein said connecting means comprises a generally J-shaped bracket secured to each of said two side walls and having a pair of legs, a stubshaft projecting from said gate and being interposed between said legs of said bracket.

4. The basket of claim 1 wherein said latching means comprises a lever arm and a latching arm being joined and pivotally mounted to said top edge of each of said two side walls, said latching arm being L-shaped, having a long leg generally orthogonal to a short leg, an end of said long leg being joined to said lever arm, said short leg engaging said gate to latch said gate in said closed position, said latching arm being capable of pivoting to thereby disengage said short leg from said gate and permit said gate to pivot to said open position.

5. The basket of claim 4 wherein said latching arm pivots upwardly in response to downwardly pressure on said lever arm permitting said gate to swing to said open position.

6. The basket of claim 4 wherein said latching arm pivots in response to gravitational forces resulting from the inclination of the basket thereby swinging said gate to said open position.

7. The basket of claim 1 wherein said gate is perforate.

8. The basket of claim 1 wherein said bottom wall, said side walls, said gate, said connecting means and said latching means are stainless steel.

9. The basket of claim 1 further comprising:
   a handle mounted to said top edge of said side walls, said handle being positioned and configured for the actuation of said latching means in association with the use of said handle.

10. The basket of claim 9 wherein said handle comprises a first bar generally perpendicular and joined to said side wall top edge, a second bar joined to both said first bar and said side wall top edge, said second bar being angled approximately 30° with respect to a horizontal plane, a grip on said second bar positioned along a plane defining the center of gravity of the basket generally parallel to said gate, said grip enabling a user to grasp said handle and pivot the basket to an inclined orientation toward the user thereby disengaging said latching means from said gate enabling said gate to pivot to said open position and the food products to fall from the basket.

11. The basket of claim 9 wherein a portion of said handle and a portion of said latching means are coated with a food grade plastic layer.

* * * * *